(12) United States Patent
Fukuichi

(10) Patent No.: US 7,251,652 B2
(45) Date of Patent: Jul. 31, 2007

(54) COMMUNITY SITE CONSTRUCTING METHOD AND SYSTEM, CENTRAL APPARATUS AND COMPUTER MEMORY PRODUCT

(75) Inventor: Yuki Fukuichi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 473 days.

(21) Appl. No.: 10/026,465

(22) Filed: Dec. 27, 2001

(65) Prior Publication Data

US 2003/0061237 A1 Mar. 27, 2003

(30) Foreign Application Priority Data

Sep. 26, 2001 (JP) ............................. 2001-295171

(51) Int. Cl.
*G06F 17/30* (2006.01)
(52) U.S. Cl. ..................... 707/5; 707/104.1; 707/3; 709/203
(58) Field of Classification Search ................ 709/203, 709/229; 707/513
See application file for complete search history.

(56) References Cited

U.S. PATENT DOCUMENTS 6,263,335 B1 * 7/2001 Paik et al. ..................... 707/5

2002/0095442 A1 * 7/2002 Hunter et al. ................ 707/513
2003/0050976 A1 * 3/2003 Block et al. ................. 709/203

FOREIGN PATENT DOCUMENTS

JP 11-112552 4/1999

* cited by examiner

*Primary Examiner*—Charles Rones
*Assistant Examiner*—Belix M. Ortiz
(74) *Attorney, Agent, or Firm*—Staas & Halsey LLP

(57) ABSTRACT

In association with identification information for identifying a representative of a community site, personal information about the representative and theme information are registered in a basic information database, while in association with identification information for identifying a member, member information about the member is registered in a member information database. Commodity information about commodities to be provided to the community site is registered in a commodity database in association with the theme information. The central apparatus extracts the optimal commodity information from the commodity database based on the theme information registered in the basic information database and then transmits the extracted commodity information to a terminal device.

15 Claims, 16 Drawing Sheets

FIG. 4

ENTER INFORMATION OF MAIN THEME

NAME OF BABY

BIRTH DATE

REGISTER MEMBERS AUTHORIZED TO
PARTICIPATE IN COMMUNITY

RELATIONSHIP WITH
REPRESENTATIVE

NAME    MAIL ADDRESS    PARENTS ▽

NAME    MAIL ADDRESS    FRIEND ▽

FIG. 7

BASIC INFORMATION DB ~151

| IDENTIFICATION INFORMATION | | PERSONAL INFORMATION | | THEME INFORMATION | |
|---|---|---|---|---|---|
| ID | PASSWORD | REPRESENT-ATIVE'S NAME | MAIL ADDRESS | MAIN THEME | DATE-AND-TIME INFORMATION |
| 1001 | **** | ○×△ | ○×××× | REPRESENTATIVE'S BABY | BIRTH DATE 2000.8.20 |
| 2001 | **** | ○○○ | ××××× | REPRESENTATIVE'S BABY | BIRTH DATE 2000.9.15 |
| 3001 | **** | △△△△ | ○○○○× | REPRESENTATIVE'S WEDDING | WEDDING DAY 2001.3.20 |
| 4001 | **** | ○××× | ○△△△△ | REPRESENTATIVE | BIRTH DATE 1972.5.16 |
| ... | ... | ... | ... | ... | ... |

FIG. 8

MEMBER INFORMATION DB ~152

| REPRESENTATIVE'S ID | IDENTIFICATION INFORMATION | | MEMBER INFORMATION | | |
|---|---|---|---|---|---|
| | ID | PASSWORD | NAME | MAIL ADDRESS | RELATIONSHIP INFORMATION |
| 1001 | 1002 | **** | ○×××× | △△○×× | MOTHER |
| | 1003 | **** | ○○○○ | ○×××× | FATHER |
| | 1004 | **** | ○○○× | ×△○○× | FRIEND |
| | ... | ... | ... | ... | ... |
| 2001 | | | | | |

FIG. 9

COMMODITY DB ~153

| THEME INFORMATION | | DATE-AND-TIME INFORMATION | | JAN. | 120'TH DAY | 1'ST YEAR | ... | 12/25 | 5/5 | ... |
|---|---|---|---|---|---|---|---|---|---|---|
| REPRESENTATIVE'S BABY | | EVENT | | SHINTO SHRINE VISITING | FIRST EATING | BIRTH-DAY | ... | CHRISTMAS | CHILDREN'S DAY | ... |
| | RELATIONSHIP INFORMATION | PARENTS | | SHINTO SHRINE VISITING SET (30,000YEN) | FIRST EATING FOOD SET (10,000YEN) | **** | ... | CHRISTMAS TREE SET (10,000YEN) | KOINOBORI (100,000YEN) | ... |
| | | RELATIVE | | SHINTO SHRINE VISITING SET (10,000YEN) | FIRST EATING COMMEMORATING SEAL (3,000YEN) | OOOx | ... | CAKE (5,000YEN) | MINI-KOINOBORI (10,000YEN) | ... |
| | | FRIEND | | SHINTO SHRINE VISITING GIFT (5,000YEN) | FIRST EATING CHOPSTICKS (1,000YEN) | **OO | ... | SWEETS SET (3,000YEN) | CANDY SET (2,000YEN) | ... |
| | | REPRE-SENTATIVE | | SHINTO SHRINE VISITING PACK (50,000YEN) | FIRST EATING DINNER SET (30,000YEN) | xxxxx | ... | CHRISTMAS PACK (30,000YEN) | MAY-DOLL SET (150,000YEN) | ... |
| | | DATE-AND-TIME INFORMATION | | 1'ST YEAR | | | ... | 6/5 | | ... |
| ALUMNI ASSOCIATION | | EVENT | | POST-GRADUATION 1'ST YEAR COMMEMORATION | | | ... | GOLF COMPETITION | | ... |
| | RELATIONSHIP INFORMATION | PROFESSOR | | COMMEMORATION PEN (30,000YEN) | | | ... | TOWEL (3,000YEN) | | ... |
| | | SENIOR | | COMMEMORATING T-SHIRT (4,000YEN) | | | ... | BALL (5,000YEN) | | ... |
| | | JUNIOR | | COMMEMORATING BADGE (10,000YEN) | | | ... | TEE (1,000YEN) | | ... |
| | | REPRESENTATIVE | | PICTURE FRAME (20,000YEN) | | | ... | GOLF YARD GUIDE (30,000YEN) | | ... |

GUIDE OF COMMUNITY FOR BABY OO

MR./MS. △OO

THE FIRST EATING OCCURS FOR BABY OO
ON COMING 30'TH. SEPTEMBER

「FIRST EATING SET」

SMALL DISHES LIKE
THOSE FOR KID' PLAY
ARE ARRANGED ON
A SMALL TRAY OF
16 cm × 21 cm
PRICE:30,000YEN

FOR APPLICATION, CONTACT:
http://www.OOx.OO

FIG. 13

| ADVERTISEMENT DB | |
|---|---|
| KEYWORD | ADVERTISEMENT INFORMATION |
| PERSONAL COMPUTER | BANNER ADVERTISEMENT A |
| HARD DISK | BANNER ADVERTISEMENT B |
| SCANNER | BANNER ADVERTISEMENT C |
| ... | ... |
| TOUR | BANNER ADVERTISEMENT E |
| OVERSEAS TOUR | BANNER ADVERTISEMENT F |
| SUITCASE | BANNER ADVERTISEMENT G |
| ... | ... |

154

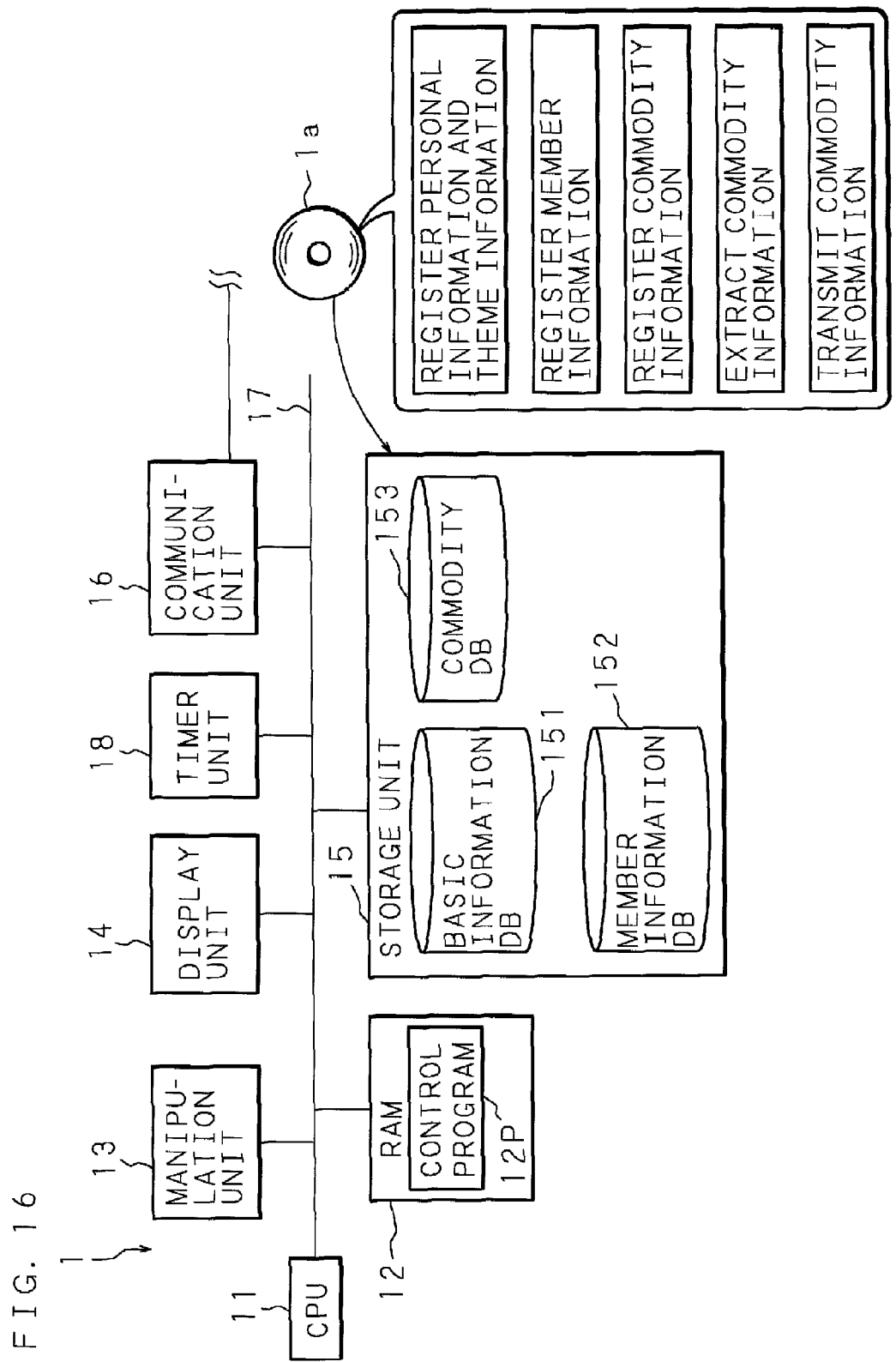

COMMUNITY SITE CONSTRUCTING METHOD AND SYSTEM, CENTRAL APPARATUS AND COMPUTER MEMORY PRODUCT

BACKGROUND OF THE INVENTION

1. Field of the Invention

The invention relates to a community site constructing method for constructing a community site on a network by utilizing the network including a central apparatus for managing the community site and a terminal device used by a representative of the community site or by a member previously authorized by the representative to have access to the community site.

2. Description of the Related Art

Recently, to construct a community on a network, there have been constructed many community sites in which only a representative of the community and specific members can participate. It is outlined as follows. As for a so-called on-line album, for example, its representative takes a digital image etc. of a wedding and uploads it to a community site to thereby prepare his original album. Then, he transmits a URL (Uniform Resource Locators) and an ID only to his family members, the participants of the wedding, and the members authorized by him to have access to the community site.

Thus, such a private community site that cannot be accessed by the third party can be formed on the network. In order to improve a communication in the community, there have been made many proposals to this community site for a variety of functions of having a bulletin board, easy commitment, easy uploading of contents such as movies, music, and commenting on these contents by the members.

Such a community is present not only of a net album but also of a university circle, alumni association, a family and relatives centering around a baby. These community sites are often provided by an enterprise; for example, a community site of a family and relatives centering around a baby is managed by an enterprise selling toys, clothes, and foods for babies in order to differentiate the other enterprises' sites. Also, such an enterprise that handles wedding ceremonies gives such a service to construct a community site centering around a bride and a groom.

On the network, however, many community sites are present, so that it is difficult to get profits therefrom; in fact, many community sites are run on an income from advertisement. Also, although a certain extent of access may be expected for a certain lapse of time after establishment of a community site, for example, a few years after the birth of a baby or the wedding, the community site often loses attention thereto gradually and disappears as time passes by, problematically.

Such a community site constructing system is desired that its representative and members continuously manage a community site without getting bored and also that an enterprise for the community site can get profits.

BRIEF SUMMARY OF THE INVENTION

In view of the above, the invention is provided.

It is a first object of the invention to provide a community site constructing method and system, a central apparatus, and a computer memory product that an enterprise provides commodity information in association with a theme of a community site to a representative or a member of a community and the representative and the member can continuously manage the community without getting bored and also that the enterprise effectively sells its commodities and provides a place of the community site to thereby collect the counter-values securely.

It is a second object of the invention to provide a community site constructing system that can provide commodity information based on relationship information about the relationship between the representative and the member to thereby provide the optimal commodity information.

It is a third object of the invention to provide a community site constructing system that enables increasing sales by giving data-and-time information to theme information and by providing the optimal commodity information corresponding to events such as a baby's birthday and Christmas.

A community site constructing method of the invention for constructing a community site on a network by utilizing the network including a central apparatus which manages a community site and a terminal device used by a representative of the community site or a member previously authorized by the representative to have access to the community site, comprising the steps of:

registering personal information about the representative and theme information of the community site in a basic information database in association with identification information for identifying the representative of the community site;

registering member information about a member in a member information database in association with identification information for identifying the member of the community site;

registering commodity information about commodities to be provided in a commodity database in association with the theme information;

extracting the commodity information from the commodity database based on the theme information registered in the basic information database; and transmitting the extracted commodity information from the central apparatus to the terminal device.

By this invention, in association with the identification information for identifying the representative of the community site, the personal information about the representative and theme information of the community site are registered in the basic information database. The registered theme information may contain, for example, information of a baby of the representative, his wedding, alumni association, and other main themes as well as the baby's name, the place of the wedding, names of the teachers at graduation and other detailed information of the main themes. Also, in association with the identification information for identifying the member of the community site, the member information about the member is registered in the member information database.

The commodity information provided by an enterprise to the community site is registered in the commodity database, while the information about each commodity is registered in association with the theme information. For example, if the main theme is a baby of the representative, the commodity information about foods, clothes for babies, etc. is registered. The central apparatus extracts the optimal commodity information from this commodity database based on the theme information registered in the basic information database. Then, the extracted commodity information is transmitted from the central apparatus to the terminal device, so that the representative and the member of the community can continuously manage the community site without getting bored also can enjoy the information about the commodities optimal to the community. Also, the enterprise can enjoy promoted sales of the commodities, thus securely collecting the counter-values for providing the place of the community site.

Also, the invention contains the relationship information about the relationship between the representative and the member as the personal information or the member information. For example, the relationship information of the both parents, relatives, friends, etc. is registered beforehand. Then, the system references the relationship information for the representative and the member to thereby transmit extracted commodity information to the terminal device. For example, in a case of giving as a present a commodity to a baby of the representative, his parents and friends typically have different commodity price levels and kinds. To accommodate these differences, the invention provides the optimal member or representative with the optimal commodity information based on the relationship information of the representative and the members to thereby further activate a community and also promote the sales of the commodities of the enterprise.

Also, the invention registers as the theme information such main theme information that involves the representative, a person related to him and an event relating to him as well as date-and-time information relating to such main theme information. For example, the representative-related person may be his baby, so that when it is handled as the main theme information, its birth date is registered as the date-and-time information. Also, if the representative-related event is his wedding handled as the main theme information, the date of the wedding is registered as the date-and-time information. The commodity database, on the other hand, registers therein the date-and-time information as the theme information, in association with which is registered the information about commodities to be provided.

For example, the commodity information is registered in association with the number of days elapsed since the birth date. In registration, a dinner set that is used when a baby eats foods for the first time corresponds to the 120'th day with respect to the birth date, the first birthday present commodity corresponds to the first year, and a knapsack and a study table correspond to the seventh year. Besides, the commodities are registered in association also with the date-and-time information of the Christmas, the Children's Day, the Doll's Day, and other events. Based on the date-and-time information (birth date) of the theme information and the date-and-time information output from a timer unit, the central apparatus calculates the number of elapsing days and the event date to thereby extract the information about the corresponding commodities from the commodity database. Then, it provides the commodity information in a mail etc. to the representative or the member in a timely manner, so that the commodity information can be provided when the presence of the community has almost faded away, thus motivating them to enter the community again. Also, the enterprise can attract the representative and the member for a prolonged time, thus keeping good sales of their commodities.

The above and further objects and features of the invention will more fully be apparent from the following detailed description with accompanying drawings.

BRIEF DESCRIPTION OF THE SEVERAL VIEWS OF THE DRAWINGS

FIG. 4 is an illustration for showing an image of entering theme information of the community site;

FIG. 7 is an illustration for showing a record layout of a basic information DB;

FIG. 8 is an illustration for showing a record layout of a member information DB;

FIG. 9 is an illustration for showing a record layout of a commodity DB;

FIG. 13 is an illustration for showing a record layout of an advertisement DB;

FIG. 16 is a block diagram for showing a hardware configuration of a central apparatus according to embodiment 3.

DESCRIPTION OF THE PREFERRED EMBODIMENTS

Embodiment 1

Figure 1:
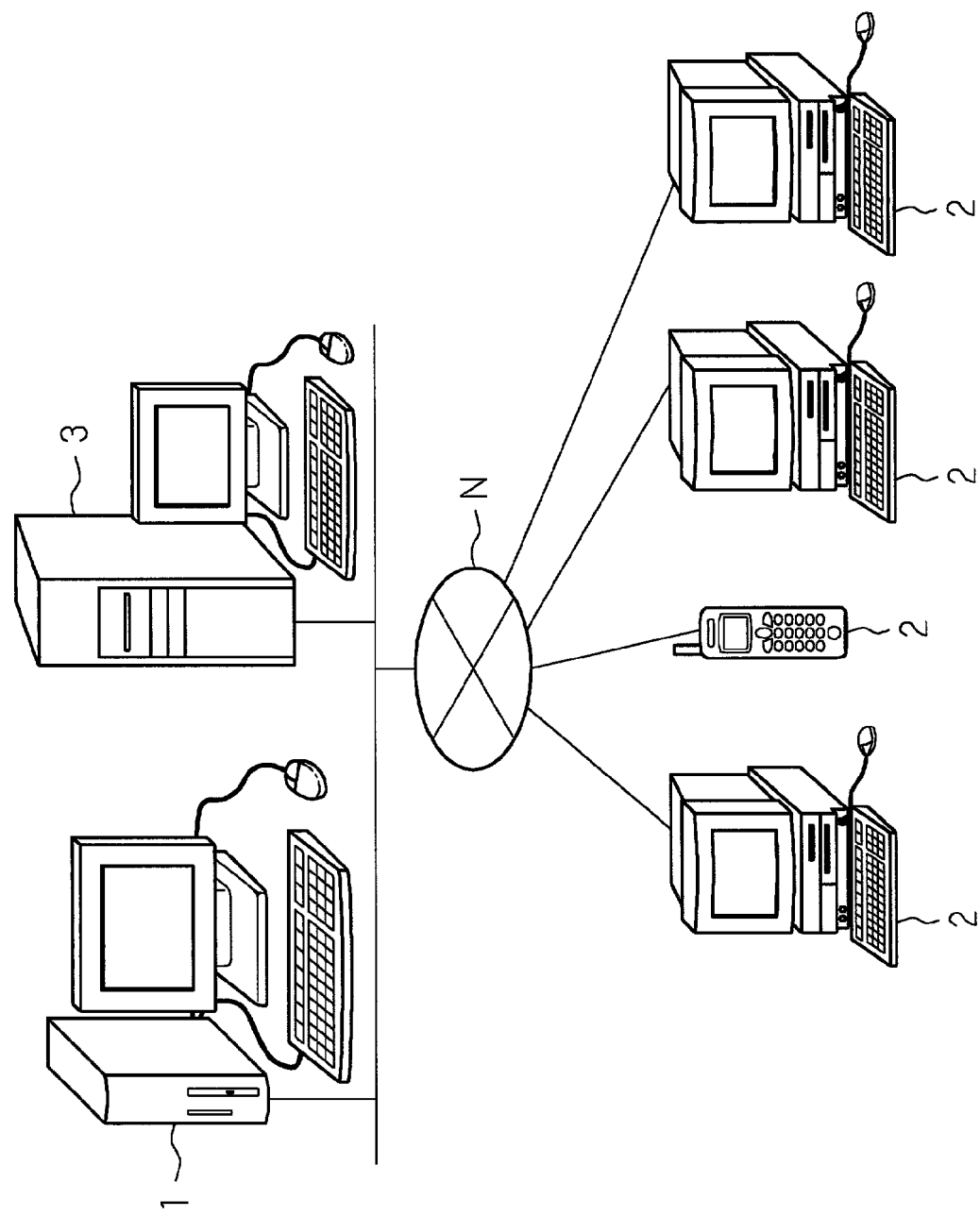
FIG. 1 is an illustration for outlining a community site constructing system of the invention.

FIG. 1 is an illustration for outlining a community site constructing system of the invention. In FIG. 1, a reference numeral 3 indicates a WWW (World Wide Web) server computer (hereinafter abbreviated as server computer), in which is stored an HTML (Hypertext Markup Language) file of a community site. To the server computer 3 are connected through a network N such as the Internet those terminal devices 2 such as a personal computer, a portable telephone, and a PDA (Personal Digital Assistant).

The representative and the members of a community use the browser at the terminal device 2 to thereby download an HTML file stored in the server computer 3 and upload image data or text data etc. to be written to a bulletin board. To the server computer 3 is also connected a central apparatus 1 of the invention. The central apparatus 1 manages the community site of the server computer 3 and also transmits commodity information etc. to the terminal device 2 at an appropriate timing. Although the embodiment of the invention is described with reference to the Internet as a network N, it is not limited thereto, but may be a LAN (Local Area network) or any other network within a predetermined space. Further, although the server computer 3 which stores the community site and the central apparatus 1 which manages it are interconnected through the network N, the functions of the server computer 3 may be incorporated into the central apparatus 1 so that it may function as a WWW server computer.

The following will describe the community site in detail. The community site is comprised of a representative who created it and members who are authorized by the representative to enter the site. To have access to the community site, an ID, a password, etc. which are previously assigned are necessary, so that only when access is authorized, one can view the community site, write something to the bulletin board, and upload image data. Such a community may be a representative's baby, his alumni association, his specific hobby, his favorite sports, his wedding, etc. The following will describe a case where the community is applied to a baby.

Figure 2:
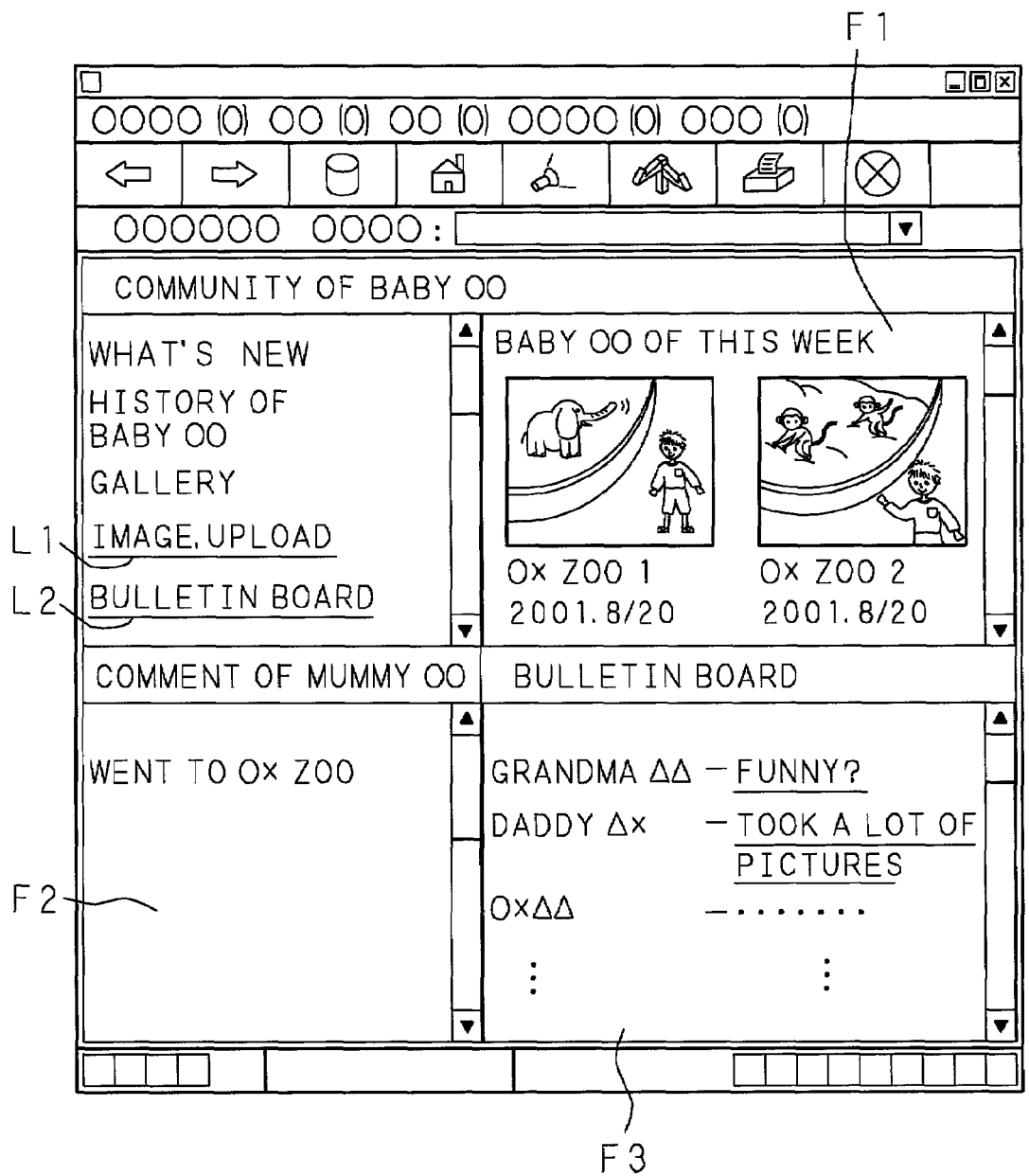
FIG. 2 is an illustration for showing an image of a community site.

FIG. 2 is an illustration for showing an image of the community site. When the server computer 3 is accessed by the representative or any one of the members through the terminal device 2, a page shown in FIG. 2 appears on the browser. When an image upload indicated by link L1 is clicked, a screen on which a file to be uploaded is entered is displayed on the browser (not shown). In this state, by transmitting image data of a baby's photograph and text data of a comment on each of the images, the image and the comment indicated by frames F1 and F2 are uploaded. Note here that the data that can be uploaded may include the data of an image file and text data as well as a moving picture file, a speech file, etc.

When a bulletin board indicated by link L2 is clicked, an entry form of text data is displayed (not shown) to thereby upload the entered text data to a bulletin board indicated by frame F3. Thus, a community is constructed by the representative and the members on the network.

Figure 3:
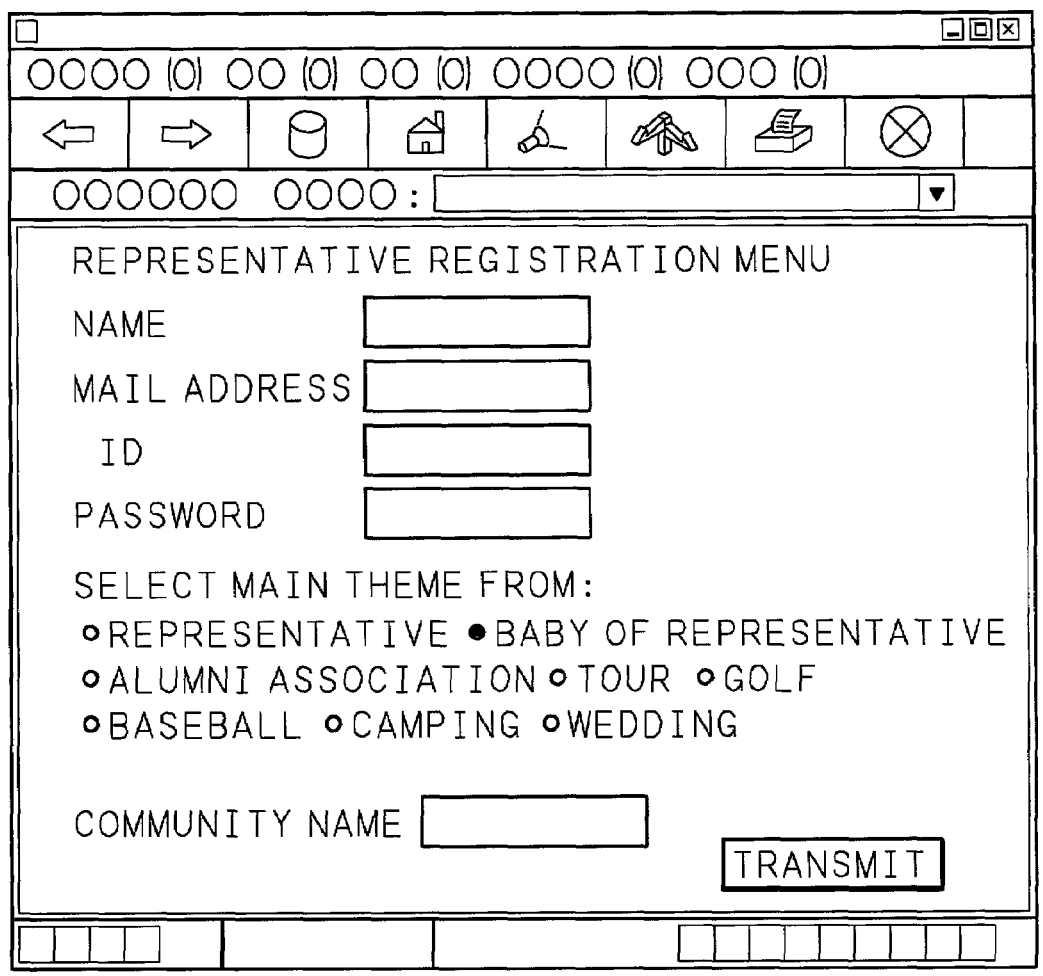
FIG. 3 is an illustration for showing an image of registering representative information.
Figure 5:
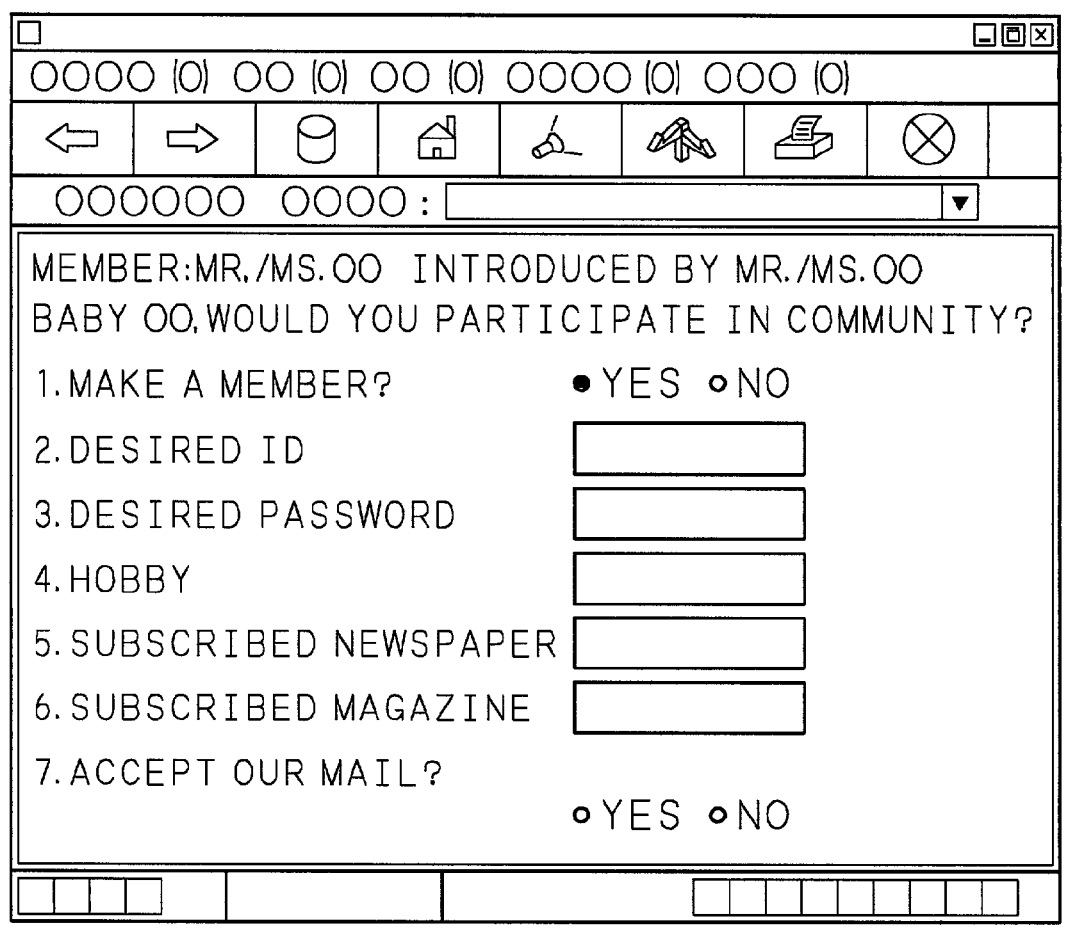
FIG. 5 is an illustration for showing an image of registering member information.

FIG. 3 is an illustration for showing an image of registering the representative information and FIG. 4 is an illustration for showing an image of inputting theme information of the community site. FIG. 5 is an illustration for showing an image of registering the member information. The following will describe a procedure for registering the representative information, the theme information, and the member information with reference to FIGS. 3 to 5 respectively. When the representative constructs a community site, a representative registration format such as shown in FIG. 3 is transmitted from the server computer 3. The representative enters his name, mail address, ID, password, and other identification information. These information items are transmitted to the central apparatus 1 and then stored in a basic-information database (hereinafter abbreviated as basic information DB) 151 shown in FIG. 6.

Further, the representative enters main theme information as the theme information of the community site. The main theme information may be of the representative, persons related to him and events relating to him and used to identify the theme of a community desired to be constructed at a community site. Specifically, he enters a community having the representative as a theme, a community having his baby as a theme, a community having a university alumni association of the representative and his friends as a theme, a community having a trip as a theme, etc. Besides, the community names are entered.

When the representative has entered his baby as the main theme information, the corresponding format is downloaded as shown in FIG. 4. Note here that such a format has a plurality of templates prepared corresponding to various main theme information items. As the theme information, the representative enters the baby's name as well as date-and-time information. When the main theme is the baby, his birth date is entered. Also, when the main theme is a wedding, the date-and-time information contains a date when the wedding was held and when it is an alumni association, the date-and-time information contains a graduation date.

Further, the representative enters the names and the mail addresses of members authorized to participate in the community site, and the relationship between himself and the members. Although by this embodiment, the relationship between the representative and the members is entered, a relationship between his related person (e.g., his baby) and the members may be entered. Thus entered theme information is registered along with the member information in the basic information DB151 and then, the central apparatus 1 transmits to a transmitted mail address of a member such a format as to prompt him to participate in the community site.

As shown in FIG. 5, a form for entering of the member information is displayed, on which the member can enter through the terminal device 2 such identification information as his ID and password and such member information as his hobby. Thus entered member information is transmitted to the central apparatus 1 and registered in a member information database (hereinafter abbreviated as member information DB; see FIG. 6) 152 of the central apparatus 1.

Figure 6:
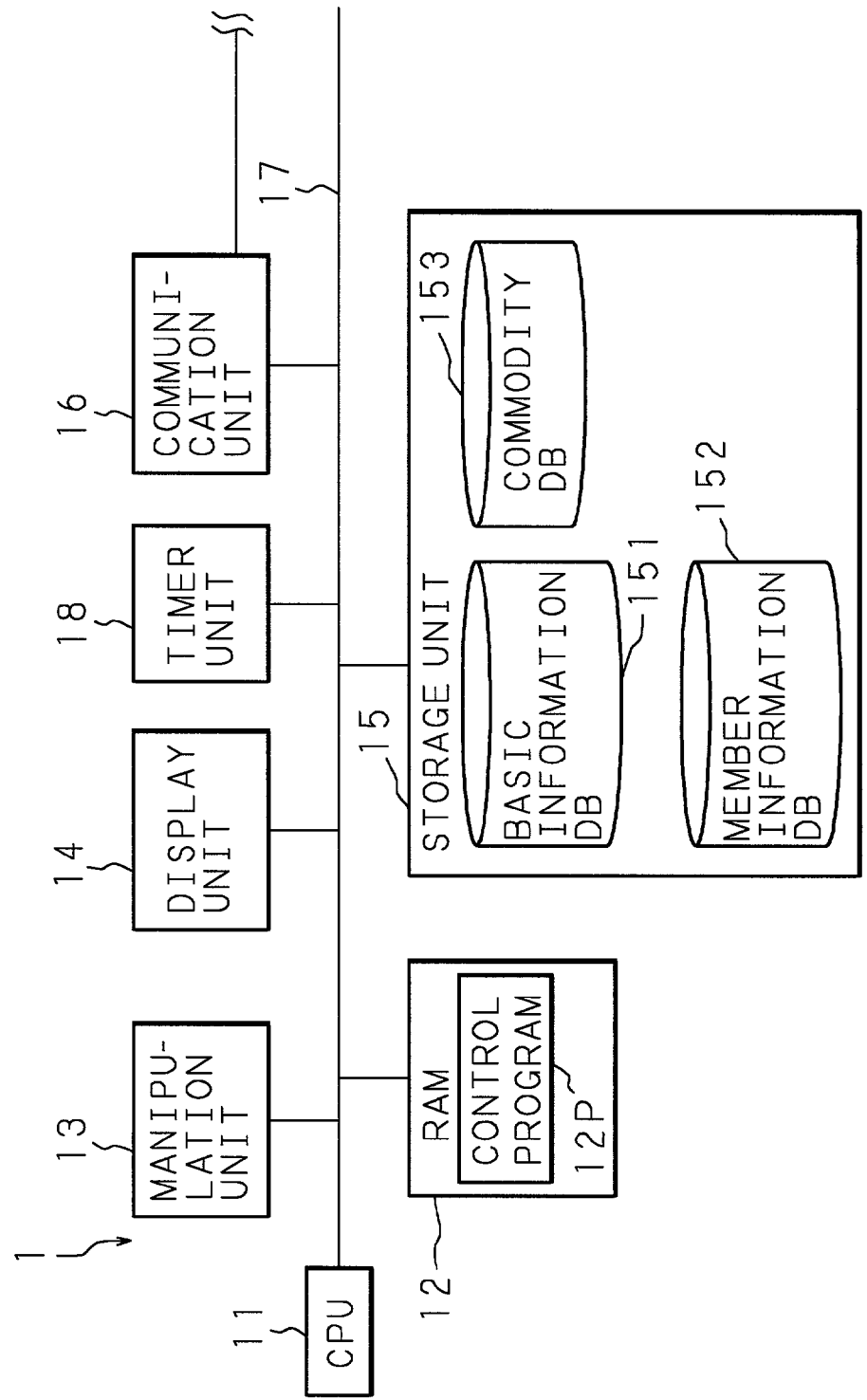
FIG. 6 is a block diagram for showing a hardware configuration of a central apparatus.

FIG. 6 is a block diagram for showing a hardware configuration of the central apparatus 1. As shown in FIG. 6, to a CPU (Central Processing Unit) 11 are connected through a bus 17 a RAM (Random Access Memory) 12, a manipulation unit 13 such as a keyboard or mouse, a display unit 14 such as an LCD, a storage unit 17 such as a hard disk, a timer unit 18, and a communication unit 16 such as a LAN-connection board etc. Also, the RAM12 stores therein a control program 12P for controlling the display unit 14 etc.

The storage unit 15 stores therein a basic information DB151 registering therein the personal information about the representative and theme information transmitted from the terminal device 2 and a member information DB152 registering therein the member information transmitted from the terminal device 2 similarly. Further, it stores a commodity DB153 registering therein the information about commodities to be supplied to the representative and the members. The following will describe record layouts of these databases.

FIG. 7 is an illustration for showing a record layout of the basic information DB151. The basic information DB151 registers therein representative information and theme information transmitted from a terminal device 2 of the representative. It specifically registers therein the representative's name, mail address, and other personal information as well as such theme information as main theme information, date-and-time information, etc. in association with such identification information as an ID and a password used to identify the representative.

FIG. 8 is an illustration for showing a record layout of the member information DB152. As shown in FIG. 8, for each representative's ID of the representative of each community site, the information about the members belonging to a relevant community site is grouped. As the member information, the name and the mail address of each member and the relationship information indicative of the relationship to the representative are registered in association with such identification information as an ID, a password, etc. used to identify the members.

FIG. 9 is an illustration for showing a record layout of the commodity DB153. The commodity DB153 registers therein the information about commodities to be supplied to the representative and members, for each item of theme information. These information items may entered appropriately through the manipulation unit 13. The commodity information is associated with the date-and-time information and the relationship information as attributes so that commodity information may be provided to an optimal person in a timely manner corresponding to a community theme.

For example, in the case of a community of a baby, such events occur as Shinto shrine visiting in one month, first eating in 120 days, birthday in one year, Christmas on 25'th December, etc. as calculated from a birth date of the date-and-time information. The central apparatus 1 calculates the number of days that have elapsed on the basis of the date-and-time information of the basic information DB151 and that output from the timer unit 18 and, when the number has reached a date registered in the commodity DB153, it provides the information about a commodity registered as the attributes. Since the commodity information is preferably supplied prior to the occurrence of an event, actually the information is provided a few weeks before the date registered in the commodity DB153.

Further, the commodity information is assigned relationship information as attributes. For example, in the case of first eating, the commodity information of a "first eating dinner set (30,000 yen)" is provided to the representative, who will use money most probably, and that of another "first eating dinner set (10,000 yen)" is provided to the parents of the representative, who will use money less most probably. To the relatives and friends, who are not expected to give such expensive commodities, the commodity information of a "first eating commemorating seal (3,000 yen)" and a "first eating chop sticks (1,000 yen)" is provided. The specific data (image data, commodity's detailed data, etc.) of these commodity information pieces is previously registered in the commodity information DB153 and so can be provided to the representative and the members.

Figure 10:
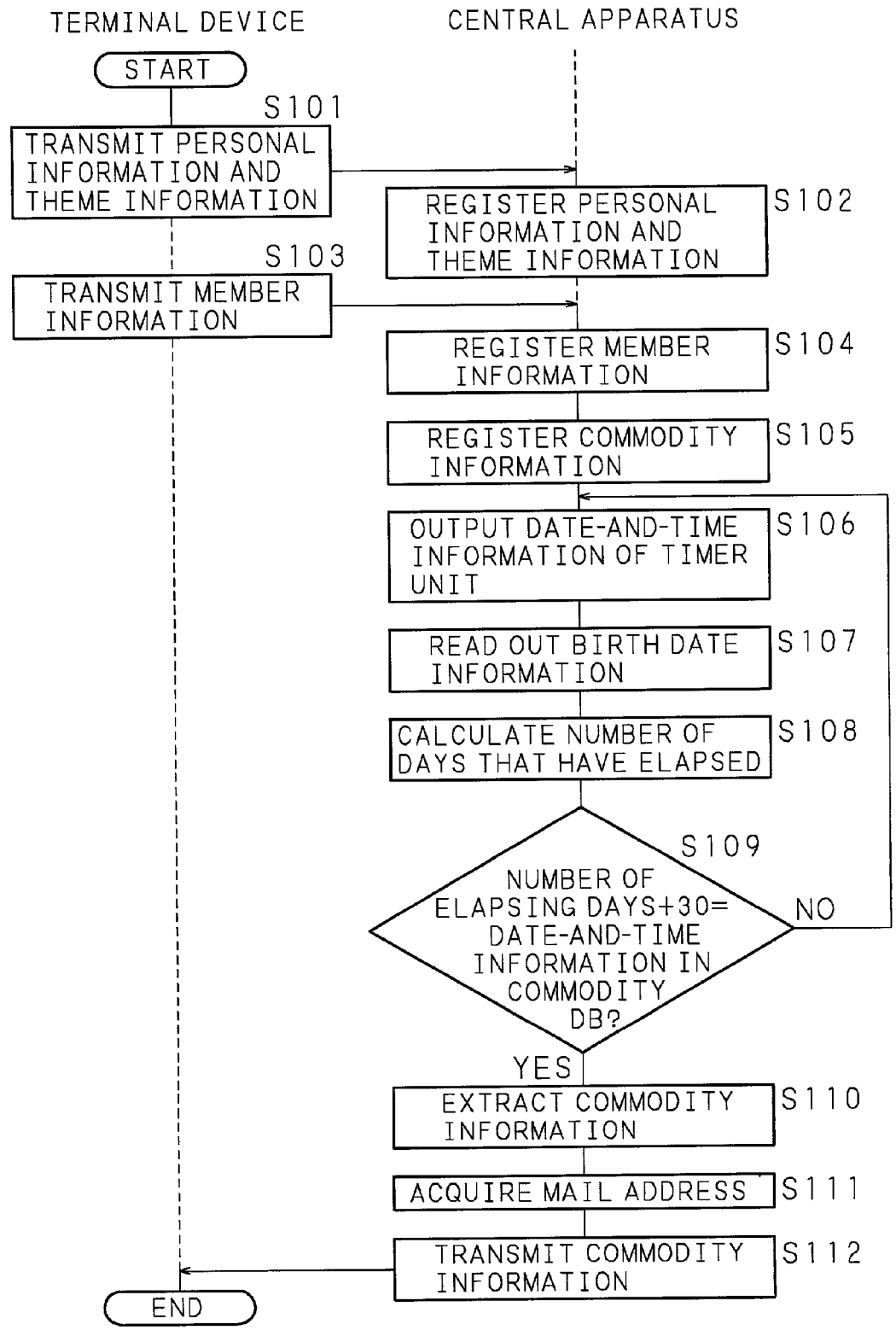
FIG. 10 is a flowchart for showing a processing procedure of the community site constructing system of the invention.

With reference to this configuration, the following will describe a processing procedure of a community site constructing system of the invention. FIG. 10 is a flowchart for showing the processing procedure of the community site constructing system of the invention. First, personal information and theme information entered at the terminal device 2 of the representative is transmitted to the central apparatus 1 (step S101). The transmitted personal information and theme information is registered in association with identification information for identifying the representative in the basic information DB151 (step S102). Also, member information entered at the terminal device 2 of each of the members is transmitted to the central apparatus 1 (step S103). The transmitted member information is registered in association with identification information for identifying each member in the member information DB152 (step S104).

The above-mentioned commodity information is previously registered in the commodity DB153 for each theme information item (step S105). Also, the commodity information is assigned the attributes of the relationship information and the date-and-time information. These information items may be entered through the manipulation unit 13 by the manager of the central apparatus 1 appropriately before the community site is started and during its operation.

After the operation of the community site is started, the CPU11 requests the timer unit 18 to output date-and-time information (step S106). Further, the CPU11 reads out birth date information registered in the basic information DB151 (step S107) to thereby calculate the number of days that has elapsed on the basis of the date-and-time information output from the timer unit 18 and thus read out date-and-time information (step S108). Then, it decides whether a total sum of the number of elapsing days and a predetermined number of correction days (30 days in this embodiment) matches the date-and-time information registered in the commodity DB153 (step 109). In this step, the number of correction days needs to be added because relevant commodity information must be provided a few days before the occurrence of an event.

If a mismatch is detected (NO is answered) at step S109, the process goes to step S106 to repeat the above-mentioned processing. When a match is detected (YES is answered) at step S109, on the other hand, that is, the current moment is 30 days before the occurrence of a relevant event, the CPU11 extracts commodity information from the commodity DB153, using the matched date-and-time information as a key (step S110). The extracted commodity information is stored in the RAM12 as assigned the attributes of the relationship information. Note here that if the event is Christmas, Children's Day, or any other day that can be identified on a calendar, the commodity information may be extracted 30 days before the registration of the date-and-time information and then transmitted.

The CPU11 acquires mail addresses of the representative and the members from the basic information DB151 and the member information DB152 respectively (step S111). Then, the CPU11 consecutively reads out the commodity information stored in the RAM12 as referencing the relationship information and transmits it to a terminal device of the corresponding mail address destination (step S112).

Figure 11:
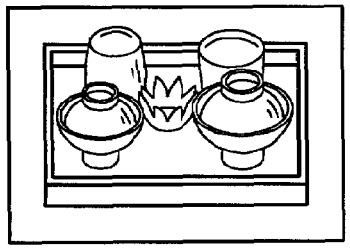
FIG. 11 is an illustration for showing information about commodities to the provided.

FIG. 11 is an illustration for showing information about commodities to be provided. As shown in FIG. 11, such an electronic mail is transmitted that is assigned the event information and the commodity information. Although by this embodiment the commodity information is distributed in a mail, the invention is not limited thereto; for example, the commodity information provided in association with identification information of the representative or members may be prepared in an HTML and uploaded at the server computer 3 so that, when access is made by the representative or members using the identification information, an HTML file corresponding to the identification information can be transmitted to the terminal device 2 to then be displayed by the browser at the terminal device 2.

Embodiment 2

Figure 12:
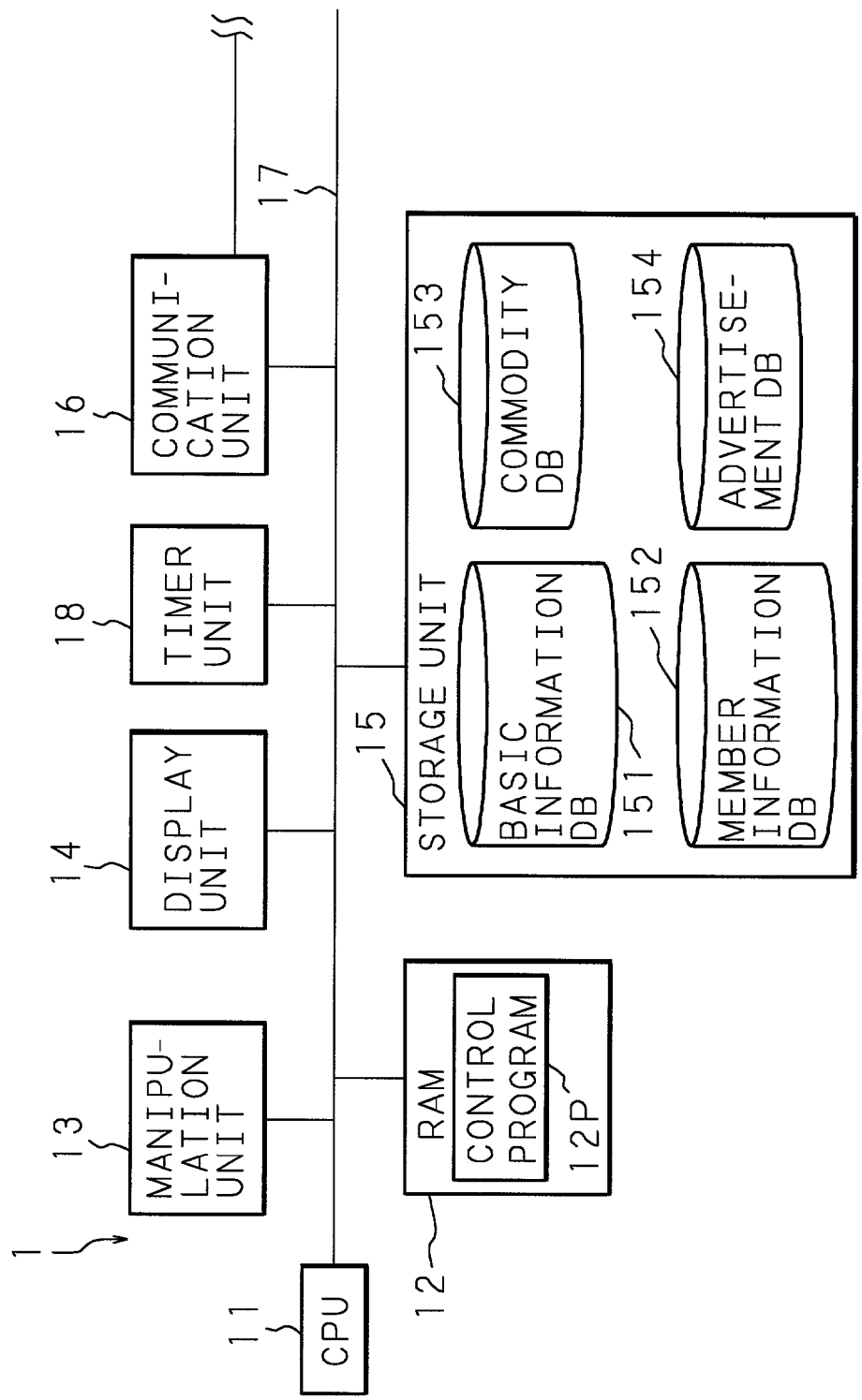
FIG. 12 is a block diagram for showing a hardware configuration of a central apparatus according to embodiment 2.

The embodiment 2 relates to technologies of analyzing information uploaded at a community site to thereby provide a community with optimal advertisement information. FIG. 12 is a block diagram for showing a hardware configuration of the central apparatus 1 according to the embodiment 2. As shown in FIG. 12, the storage unit 15 registers therein an advertisement database (hereinafter abbreviated as advertisement DB) 154 in which advertisement information is registered in association with a keyword.

FIG. 13 is an illustration for showing a record layout of the advertisement DB154. As shown in FIG. 13, the advertisement information is registered in association with the keyword. As the advertisement information, for example, information relating to banner advertisement displayed on the browser is registered. The CPU11 acquires information which is transmitted and uploaded to a community site of the server computer 3 from a terminal device 2 of the representative or a member and then references the advertisement DB154 to extract a keyword. When the keyword is extracted, the CPU11 reads out one of the corresponding advertisement information items and registers it to the community site.

Figure 14:
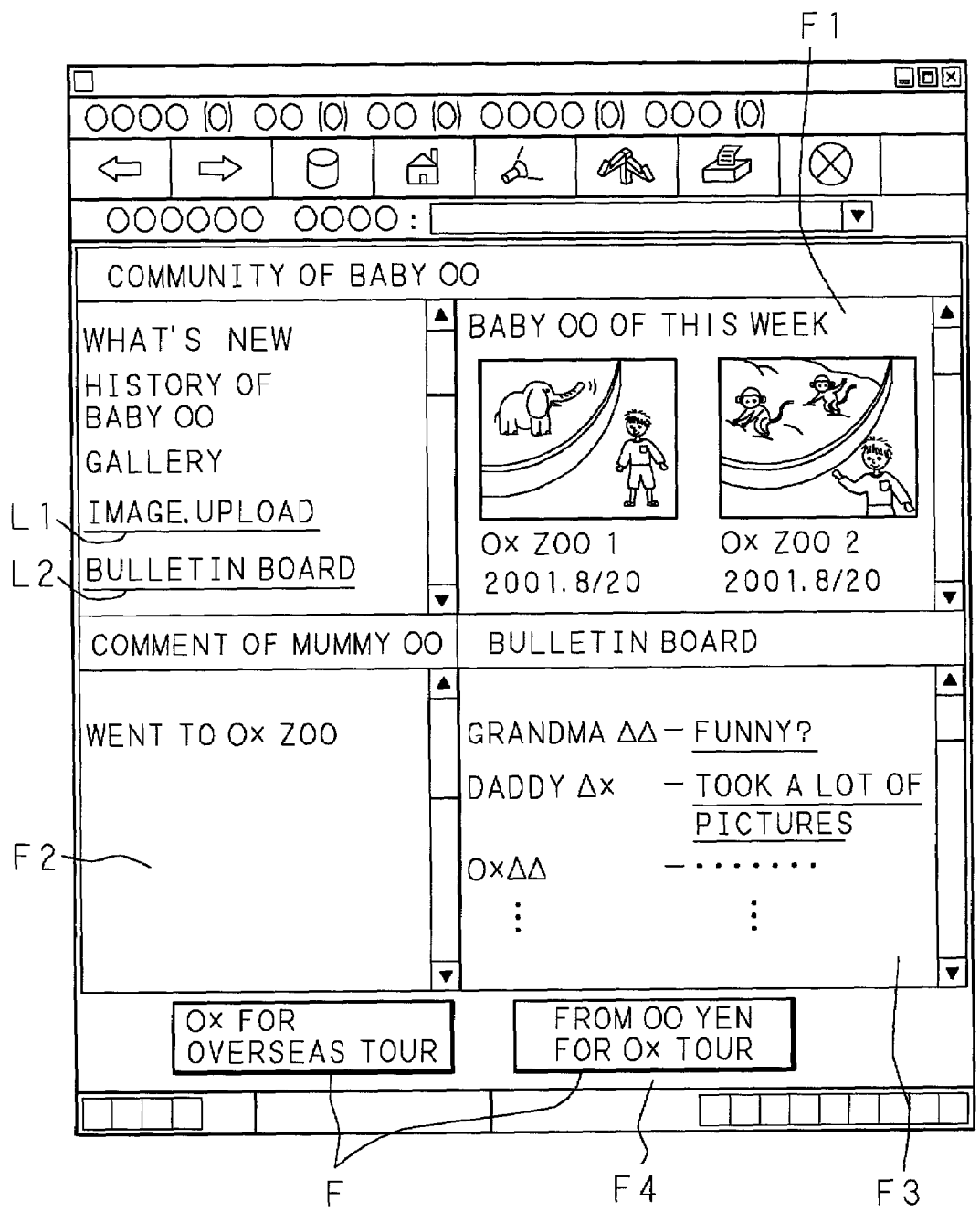
FIG. 14 is an illustration for showing an image of displaying advertisement information on a browser.

FIG. 14 is an illustration for showing an image of displaying advertisement information on the browser. On the browser of the representative or member, the advertisement information corresponding to the keyword is displayed. In frame F4 is displayed a banner advertisement B, which is registered as advertisement information. The banner advertisement B is assigned a hyperlink so that when it is clicked, the process jumps to a link destination.

Figure 15:
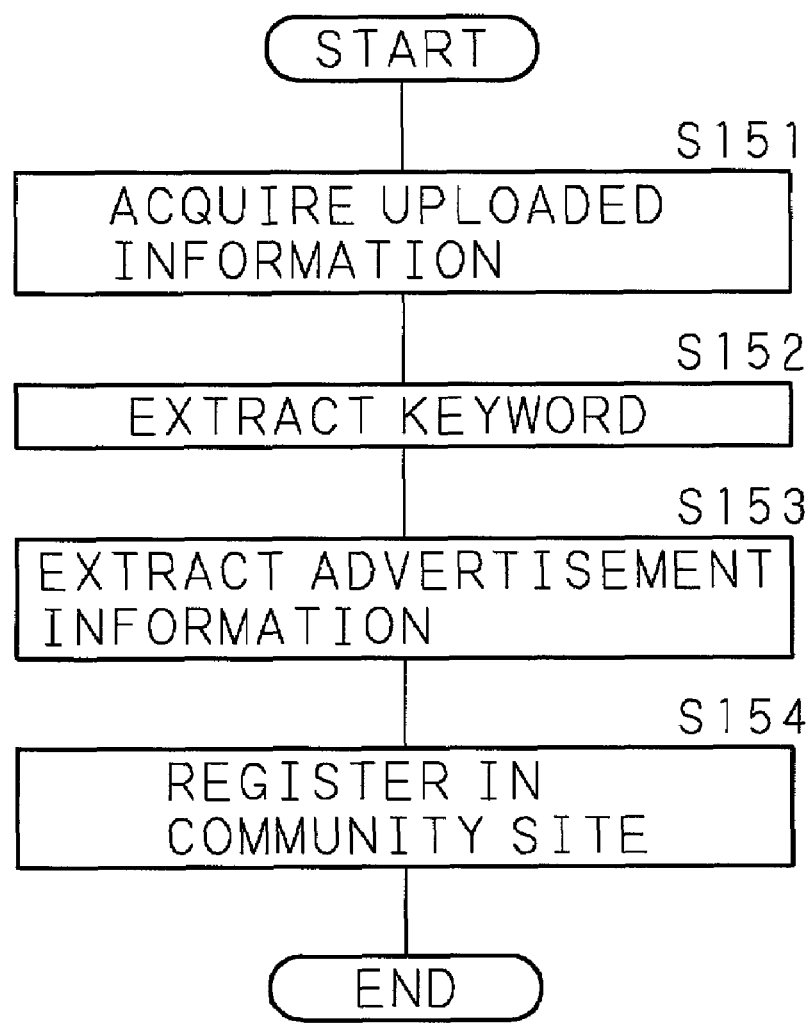
FIG. 15 is a flowchart for showing a processing procedure of registering advertisement information.

FIG. 15 is a flowchart for showing a processing procedure of registering advertisement information. The central apparatus 1 acquires information uploaded at the server computer 3, for example, information written to a bulletin board (step S151). The central apparatus 1 extracts such a keyword from this uploaded information that matches a keyword registered in the advertisement DB154 (step S152). When a matched keyword is detected, the process extracts advertisement information corresponding to this keyword from the advertisement DB154 (step S153). The extracted advertisement information is registered in a community site of the server computer 3 (step S154). With this, when the representative or any one of the members has browsed the community site from the terminal device 2, such advertisement information that matches a common topic is displayed, so that the community participants can be provided with useful information and an enterprise providing the community site can also provide effective advertisement information.

The embodiment 2 of the invention having such a configuration as described above, the other parts and operations are almost the same as those of the embodiment 1 and the same parts are indicated by the same reference numerals and their detailed explanation is omitted.

Embodiment 3

FIG. 16 is a block diagram for showing a configuration of the central apparatus 1 according to the embodiment 3. The computer program for operating the central apparatus 1 according to the embodiment 1 can be pre-installed at the central apparatus 1 according to the embodiment 3 or recorded in a portable computer memory product such as a CD-ROM, MO, etc. Further, it may be propagated in a carrier wave through the line. The following will describe it specifically.

In the storage unit 15 of the central apparatus 1 shown in FIG. 16 is installed a computer memory product 1a (CD-ROM, MO, or DVD-ROM) which records therein a program for causing the central apparatus 1 to register the personal information and the theme information, to register the member information, to register the commodity information, to extract the commodity information and to transmit the commodity information. Such a program is loaded in the RAM12 of the central apparatus 1 to be executed. This permits the central apparatus 1 to function as that of the invention described above.

The embodiment 3 of the invention having such a configuration as described above, the other parts and operations are almost the same as those of the embodiments 1 and 2 and these parts are indicated by the same reference numerals and so their detailed explanation is omitted.

As this invention may be embodied in several forms without departing from the spirit of essential characteristics thereof, present embodiments are therefore illustrative and not restrictive, since the scope of the invention is defined by the appended claims rather than by the description preceding them, and all changes that fall without metes and bounds of the claims, or equivalence of such metes and bounds thereof are therefore intended to be embraced by the claims.

What is claimed is:

1. A community site constructing method for constructing a community site on a network, by utilizing a network including a central apparatus which manages a community site and includes a timer unit and a terminal device used by a representative of the community site or a member previously authorized by the representative to have access to the community site, the method comprising:

registering personal information about the representative and theme information of the community site in a basic information database in association with identification information for identifying the representative of the community site;

registering member information about a member in a member information database in association with identification information for identifying the member of the community site;

registering commodity information about commodities to be provided in a commodity database in association with the theme information;

extracting the commodity information from the commodity database based on the theme information registered in the basic information database and a chronological value; and transmitting the extracted commodity information from the central apparatus to the terminal device, wherein:

the theme information includes information about the representative, a person related to the representative, a main theme including an event relating to the representative, and date-and time relating to the main theme;

the commodity database has the commodity information about commodities to be provided, registered therein in association with the date-and-time information; and the chronological value is based on the date-and-time information of the theme information and date-and-time information output from the timer unit.

2. A community site constructing system for constructing a community site on a network, comprising:

a central apparatus for managing a community site;

a terminal device used by a representative of the community site or a member previously authorized by the representative to have access to the community site;

a basic information database in which personal information about the representative and theme information of the community site is registered in association with identification information for identifying the representative of the community site;

a member information database in which member information about a member is registered in association with identification information for identifying the member of the community site; and a commodity database in which commodity information about commodities to be provided is registered in association with the theme information, wherein the central apparatus extracts the commodity information from the commodity database based on the theme information registered in the basic information database and a chronological information, and transmits the extracted commodity information to the terminal device, wherein:

the theme information includes information about the representative, a person related to the representative, a main theme including an event relating to the representative, and date-and-time relating to a main theme;

the commodity database has the commodity information about commodities to be provided, registered therein in association with the date-and-time information; and the chronological value is based on the date-and-time information of the theme information and date-and-time information output from a timer unit of the central apparatus.

3. The community site constructing system according to claim 2, wherein;
the member information includes relationship information about the relationship between the representative and the member; and
wherein the transmission operation includes the operation of transmitting the extracted commodity information to the terminal device by reference to the relationship information.

4. The community site constructing system according to claim 3, wherein:
the theme information includes information about the representative, a person related to the representative, a main theme including an event relating to the representative, and date-and-time relating to the main theme;
the commodity database has the commodity information about commodities to be provided, registered therein in association with the date-and-time information
wherein the central apparatus further includes a timer unit; and
wherein the processor of the central apparatus is further capable of performing the operation of extracting the commodity information from the commodity database based on the date-and-time information of the theme information and the date-and-time information output from the timer unit.

5. The community site constructing system according to claim 2, wherein:
the date-and-time information relating to the main theme is birth date information of a baby of the representative; and
wherein the extracting operation further includes the operation of calculating the number of days elapsed since the birth date based on the birth date information and the date-and-time information output from the timer unit and extracting from the commodity database information about a commodity corresponding to the calculated number of elapsing days.

6. The community site constructing system according to claim 4, wherein:
the date-and-time information relating to the main theme is birth date information of a baby of the representative; and
wherein the extracting operation further includes the operation of calculating the number of days elapsed since the birth date based on the birth date information and the date-and-time information output from the timer unit and extracting from the commodity database information about a commodity corresponding to the calculated number of elapsing days.

7. The community site constructing system according to claim 2, further comprising an advertisement database in which advertisement information is registered in association with a keyword, wherein the processor of the central apparatus is further capable of performing the following operations of
extracting the keyword from information uploaded to the community site;
extracting the advertisement information corresponding to the extracted keyword; and
registering the extracted advertisement information in the community site.

8. A central apparatus for managing a community site in which a representative and a member previously authorized by the representative to have access to the community site participate, the central apparatus comprising:
a processor
registering personal information about the representative and theme information of the community site in a basic information database in association with identification information for identifying the representative of the community site;
registering member information about a member in a member information database in association with identification information for identifying the member of the community site;
registering commodity information about commodities to be provided in a commodity database in association with the theme information;
extracting the commodity information from the commodity database based on the theme information registered in the basic information database and a chronological value; and
transmitting the extracted commodity information to the outside, wherein:
the theme information includes information about the representative, a person related to the representative, a main theme including an event relating to the representative, and date-and time relating to the main theme;
the commodity database has the commodity information about commodities to be provided, registered therein in association with the date-and-time information; and
a timer unit wherein the chronological value is based on the date-and-time information of the theme information and date-and-time information output from the timer unit.

9. A computer memory product in which a computer program is recorded, the computer program causing a computer to manage a community site in which a representative and a member previously authorized by the representative to have access to the community site participate, the computer program comprising:
a first module causing the computer to register personal information about the representative and theme information of the community site in a basic information database in association with identification information for identifying the representative of the community site;
a second module causing the computer to register member information about a member in a member information database in association with identification information for identifying the member of the community site;
a third module causing the computer to register commodity information about commodities to be provided in a commodity database in association with the theme information;
a fourth module causing the computer to extract the commodity information from the commodity database based on the theme information registered in the basic information database and a chronological value; and
a fifth module causing the computer to transmit the extracted commodity information to the outside, wherein:
the theme information includes information about the representative, a person related to the representative, a main theme including an event relating to the representative, and date-and-time relating to the main theme;

the commodity database has the commodity information about commodities to be provided, registered therein in association with the date-and-time information; and the chronological value is based on the date-and-time information of the theme information and date-and-time information output from a timer unit.

10. A community site constructing system for constructing a community site on a network, comprising:

a central apparatus for managing a community site;

a terminal device used by a representative of the community site or a member previously authorized by the representative to have access to the community site;

a basic information database in which personal information about the representative and theme information of the community site is registered in association with identification information for identifying the representative of the community site;

a member information database in which member information about a member is registered in association with identification information for identifying the member of the community site; and a commodity database in which commodity information about commodities to be provided is registered in association with the theme information, wherein:

the central apparatus includes:

extraction means for extracting the commodity information from the commodity database based on the theme information registered in the basic information database and a chronological value;

a timer unit; and transmission means for transmitting the extracted commodity information to the terminal device, wherein:

the theme information includes information about the representative, a person related to the representative, a main theme including an event relating to the representative, and date-and time relating to the main theme;

the commodity database has the commodity information about commodities to be provided, registered therein in association with the date-and-time information; and the chronological value is based on the date-and-time information of the theme information and date-and-time information output from the timer unit.

11. The community site constructing system according to claim 10, wherein;

the member information includes relationship information about the relationship between the representative and the member; and the transmission means refers to the relationship information and transmits the extracted commodity information to the terminal device.

12. The community site constructing system according to claim 10, wherein:

the date-and-time information relating to the main theme is birth date information of a baby of the representative; and the extraction means calculates the number of days elapsed since the birth date based on the birth date information and the date-and-time information output from the timer unit and extracts from the commodity database information about a commodity corresponding to the calculated number of elapsed days.

13. The community site constructing system according to claim 10, further comprising an advertisement database in which advertisement information is registered in association with a keyword, wherein the processor of the central apparatus further includes:

means for extracting the keyword from information uploaded to the community site;

means for extracting the advertisement information corresponding to the extracted keyword; and means for registering the extracted advertisement information in the community site.

14. A central apparatus for managing a community site in which a representative and a member previously authorized by the representative to have access to the community site participate, comprising:

means for registering personal information about the representative and theme information of the community site in a basic information database in association with identification information for identifying the representative of the community site;

means for registering member information about a member in a member information database in association with identification information for identifying the member of the community site;

means for registering commodity information about commodities to be provided in a commodity database in association with the theme information;

means for extracting the commodity information from the commodity database based on the theme information registered in the basic information database and a chronological value;

a timer; and means for transmitting the extracted commodity information to the outside, wherein:

the theme information includes information about the representative, a person related to the representative, a main theme including an event relating to the representative, and date-and time relating to the main theme;

the commodity database has the commodity information about commodities to be provided, registered therein in association with the date-and-time information; and the chronological value is based on the date-and-time information of the theme information and date-and-time information output from the timer unit.

15. A community site constructing method for constructing a community site on a network, comprising:

accepting information about a representative of the community site, information about a member authorized by the representative to have access to the community site, and theme information of the community site;

storing for each community site the accepted information in association to one another;

transmitting a message to the member for confirming his or her request for access to the community site;

notifying the member, whose request for access to the community site is received, of authentication information for the access, thereby permitting access to the community site;

retrieving commodity information about the theme information of the community site from a data base in which theme information is stored in association with commodity information related to the theme information when the member participates in the community site; and displaying, as community site information, a content including the commodity information, wherein:

the theme information includes information about the representative, a person related to the representative, a main theme including an event relating to the representative, and date-and time relating to the main theme;

the commodity database has the commodity information about commodities to be provided, registered therein in association with date-and-time information; and the retrieving of the commodity information from the commodity database is performed according to a chronological value, based on the date-and-time information of the theme information and date-and-time information output from a timer unit.

* * * * *